United States Patent
Li et al.

(10) Patent No.: US 9,744,474 B2
(45) Date of Patent: Aug. 29, 2017

(54) METHOD AND APPARATUS FOR RECOVERING SOLIDS FROM WATER-BASED EFFLUENT

(71) Applicants: Xiaomei Li, Edmonton (CA); Yongsheng Feng, Edmonton (CA); Weijiao Li, Kunming (CN); Xiaoqiu Xu, Nangang (CN)

(72) Inventors: Xiaomei Li, Edmonton (CA); Yongsheng Feng, Edmonton (CA); Weijiao Li, Kunming (CN); Xiaoqiu Xu, Nangang (CN)

( * ) Notice: Subject to any disclaimer, the term of this patent is extended or adjusted under 35 U.S.C. 154(b) by 798 days.

(21) Appl. No.: 14/037,353

(22) Filed: Sep. 25, 2013

(65) Prior Publication Data
US 2014/0083919 A1 Mar. 27, 2014

Related U.S. Application Data (60) Provisional application No. 61/705,423, filed on Sep. 25, 2012.

(51) Int. Cl.
*B01D 1/22* (2006.01)
*B01D 1/28* (2006.01)
(Continued)

(52) U.S. Cl.
CPC ............ *B01D 1/221* (2013.01); *B01D 1/007* (2013.01); *B01D 1/0064* (2013.01); *B01D 1/16* (2013.01);
(Continued)

(58) Field of Classification Search
CPC ......... B01D 1/007; B01D 1/06; B01D 1/065; B01D 1/16; B01D 1/18; B01D 1/20;
(Continued)

(56) References Cited

U.S. PATENT DOCUMENTS 3,417,804 A * 12/1968 Chirico ................. B01D 1/065
134/31
3,469,615 A * 9/1969 Usher ................... B01D 1/221
159/13.1
(Continued)

FOREIGN PATENT DOCUMENTS

CA 1070930 2/1980
DE 956937 C * 1/1957 ............... B01D 1/22
(Continued)

OTHER PUBLICATIONS

Huang et al., "Complex treatment of the ammonium nitrogen wastewater from rare-earth separation plant", Desalination and Water Treatment, 8(2009) 109-117, Published Aug. 2009. URL: http://www.deswater.com/DWT_abstracts/vol_8/8_2009_109.pdf.
(Continued)

*Primary Examiner* — Katherine Zalasky
*Assistant Examiner* — Benjamin Lebron
(74) *Attorney, Agent, or Firm* — Davis & Bujold PLLC; Michael J. Bujold (57) ABSTRACT

A method of recovering solids from water-based effluent. A first step involves evaporating wastewater effluent containing a liquid contaminant, such as ammonium to recover a concentrated solution and a water effluent stream. Where the water effluent stream includes solids, further step can be taken to dry the wastewater effluent further to recover solids, such as by using a thin plate evaporator and a heat exchanger disk evaporator.

10 Claims, 11 Drawing Sheets

(51) Int. Cl.
    *B01D 1/00*     (2006.01)
    *C02F 1/12*     (2006.01)
    *B01D 1/16*     (2006.01)
    *C02F 101/16*     (2006.01)
    *C02F 103/10*     (2006.01)
    *C02F 103/20*     (2006.01)
    *C02F 103/32*     (2006.01)

(52) U.S. Cl.
    CPC ............... *B01D 1/22* (2013.01); *B01D 1/28* (2013.01); *B01D 1/2846* (2013.01); *C02F 1/12* (2013.01); *C02F 2101/16* (2013.01); *C02F 2103/10* (2013.01); *C02F 2103/20* (2013.01); *C02F 2103/32* (2013.01); *F26B 2200/18* (2013.01)

(58) Field of Classification Search
    CPC . B01D 1/22; B01D 1/221; B01D 1/26; B01D 1/2846; B01D 1/30; C02F 1/12; C02F 1/44; C02F 1/52; C02F 1/56; C02F 2101/16; C02F 2103/10; C02F 2103/20; C02F 2103/32; C02F 11/123; C02F 11/185; F26B 2200/18; F26B 2200/0218; F24F 3/1417; F28D 3/00
    See application file for complete search history.

(56) References Cited

U.S. PATENT DOCUMENTS

| | | | |
|---|---|---|---|
| 3,576,607 A | | 4/1971 | Guttmann et al. |
| 3,808,104 A | * | 4/1974 | Davidson .............. B01D 1/22 159/18 |
| 4,082,616 A | * | 4/1978 | Antony ................ B01D 1/16 202/173 |
| 4,292,043 A | | 9/1981 | Denecker et al. |
| 4,424,098 A | * | 1/1984 | Hartig .................. B01D 1/22 159/13.1 |
| 4,963,231 A | * | 10/1990 | Ryham ................ B01D 1/0094 159/16.1 |
| 5,536,385 A | | 7/1996 | Sheldon et al. |
| 5,738,761 A | * | 4/1998 | Fletcher ................ C02F 1/048 159/24.1 |
| 6,027,607 A | * | 2/2000 | Corniel ................ B01D 1/16 159/23 |
| 6,086,722 A | | 7/2000 | Webster, Jr. et al. |
| 6,638,398 B1 | | 10/2003 | Ramm-Schmidt et al. |
| 7,326,391 B2 | | 2/2008 | Shuki et al. |
| 2008/0111001 A1 | * | 5/2008 | Elmer ................ B05B 12/008 239/11 |

FOREIGN PATENT DOCUMENTS

| | | |
|---|---|---|
| JP | 2006212605 A | 8/2006 |
| JP | 2006212606 A | 8/2006 |
| WO | 9857898 | 12/1998 |

OTHER PUBLICATIONS

Liang et al., "Energy-Saving Study of a System for Ammonium Sulfate Recovery from Wastewater with Mechanical Vapor Compression (MVC)", Research Journal of Applied Sciences, Engineering and Technology, 3(11): 1227-1232, Published Nov. 25, 2011. URL: http://maxwellsci.com/print/rjaset/v3-1227-1232.pdf.

* cited by examiner

METHOD AND APPARATUS FOR RECOVERING SOLIDS FROM WATER-BASED EFFLUENT

FIELD

There is described a method of recovering solids from water-based effluents, such as municipal and food processing wastewater, anaerobic digestate, liquid hog and dairy manure, and oil sands and other mining tailings.

BACKGROUND

Many waste effluents, such as digestate from wet anaerobic digestion of biowaste, contain significant amount of plant nutrients, such as ammonium, as well as organic matter. The organic component in these effluents, often rich in phosphorus and potassium, when properly dried and pelletized, can be used as high-valued bio-fertilizer that is easily transported and applied. Other effluents may contain other contaminants, such as chemicals in the tailings of a mining or oil sands process.

In the case of biowaste streams, currently dominant, wet-digestion technology requires biowastes to be in a low solid content slurry form, achieved by addition of large volume of water, for efficient biogas production and system operation. Ammonia concentration in biogas digestate can reach as high as 2000 ppm, often an important limiting factor for the anaerobic digestion process. The high ammonia concentration in digestate prevents the recycling of process water in the digesters, which could significantly reduce the amount of water being used, as well as the volume of digestate that needs final processing and disposal.

The large volumes of digestate, which could be a significant source of fugitive GHG emissions needs further treatment or disposal. In most cases the volume of digestate produced exceeds the original volume of biowaste entering the digester, and the digestate can be more difficult to treat or dispose than the initial biowaste. Full realization of biogas technology's economic and environmental benefits requires effective treatment of digestate.

The most common treatment option for digestate is storage in lagoons followed by land application. It is bulky, heavy, and relatively low in nutrient concentration, making its application non-economical at any significant distance from the source. Localized over application creates environmental concerns of surface and ground water contamination. Waste water treatment sludge is also often applied on land as fertilizer. Most waste water treatment plants eliminate nitrogen in waste water by denitrification, which converts most of ammonia to nitrogen gas. This process, however, significantly reduces the nutrient of the produced sludge.

SUMMARY

There is provided a separator for separating fluid from a water-based effluent. The separator comprises a plurality of effluent flow channels and a plurality of heated fluid flow channels having a heated fluid inlet and a heated fluid outlet. The heated fluid flow channels are adjacent to the effluent flow channels for transferring heat from a heated fluid to the effluent flow channels to vaporize a portion of the water-based effluent. A vapour outlet collects a vaporized portion of the water-based effluent. A series of sumps are connected to receive effluent from the plurality of effluent flow channels. The series of sumps are connected by baffles that permit fluid to flow into an adjacent sump, wherein each effluent flow channel deposits effluent into a designated sump. A fluid manifold injects water-based effluent into the plurality of effluent flow channels. The fluid manifold comprises a first injector that is connected to receive water-based effluent from a source of water-based effluent and from a first sump at a first end of the series of sumps and a second injector that is connected to receive water-based effluent from a second sump at a second end of the series of sumps opposite the first end. The effluent flow channels that deposit effluent into the first sump receives water-based effluent from the fluid manifold having a higher water content than the effluent flow channels that deposit effluent into the second sump.

According to another aspect, the effluent flow channels and the heated fluid flow channels are defined by a series of parallel plates. The direction of flow through the effluent flow channels may be perpendicular or antiparallel to the direction of flow through the heated fluid flow channels.

According to an aspect, more effluent flow channels may deposit effluent into the first sump than in the second sump.

According to another aspect, the first and second injectors may comprise nozzles for spraying effluent into the flow channels.

According to another aspect, the first and second injectors may have openings that are scaled to inject effluent in a gradient across a plurality of effluent flow channels associated with a plurality of sumps, such that the first injector injects more fluid into the effluent flow channels associated with the first sump and the second injector injects more fluid into the effluent flow channels associated with the second sump.

According to another aspect, the manifold may be a sealed unit connected to the effluent flow channels and further comprises a pump to remove the vaporized portion of the water-based effluent. The pump may be a compressor that compresses the vaporized portion and injects a resulting stream of heated steam into the heated fluid inlet. The heated fluid outlet may comprise an outlet for condensed steam.

There is further provided, according to an aspect, a separator for separating fluid from a water-based effluent, comprising a housing defining a cylindrical bore and having an effluent inlet for receiving water-based effluent and an effluent outlet for discharging the dried water-based effluent. A shaft has a heated fluid flow path. A series of heat exchanger disk assemblies are spaced along the cylindrical bore between the effluent inlet and the effluent outlet, each heat exchanger disk assembly comprising an inner chamber in fluid communication with the heated flow path to heat an outer surface, the outer surface vaporizing a portion of the water-based effluent, where each heat exchanger disk assembly comprises an effluent driving surface that distributes a portion of the water-based effluent on the heated outer surface and moves another portion of the water-based effluent from the effluent inlet to the effluent outlet.

According to another aspect, the shaft may be a hollow split shaft and the heated fluid path comprises a supply path and a return path.

According to another aspect, the inner chamber may be connected to an inlet port and an outlet port on the shaft, the inner chamber having internal baffles that define an inner flow path between the inlet port and the outlet port.

According to another aspect, the outer surface is a rotating disk mounted to the shaft. The effluent driving surface may comprise one or more vanes extending outward from the shaft that rotate relative to the outer surface. The one or more vanes may carry a driver portion toward the housing that extends outward past the outer surface of the rotating disk and pushes effluent past the outer surface toward the outlet. The one or more vanes may further comprise at least one scraper vane that engages the outer surface to remove the effluent from the outer surface. The shaft may comprise a first portion that rotates the outer surface and a second portion that rotates the one or more vanes opposite in a direction opposite the rotation of the first portion. The one or more vanes may be curved to lift a portion of the effluent and spread the effluent on the rotating disk.

According to another aspect, the outlet may comprise a perforated plate that is fed by an auger.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A method of recovering liquid and vapour contaminants and solids from wastewater effluent will now be described with reference to FIG. 1. The description below relates to a preferred embodiment in the context of a biowaste stream that contains ammonium. It will be understood that similar principles may be applied to other types of waste streams with similar characteristics. It will also be understood that many of the elements described may be omitted or replaced with other techniques known in treating waste effluent streams.

Figure 1:
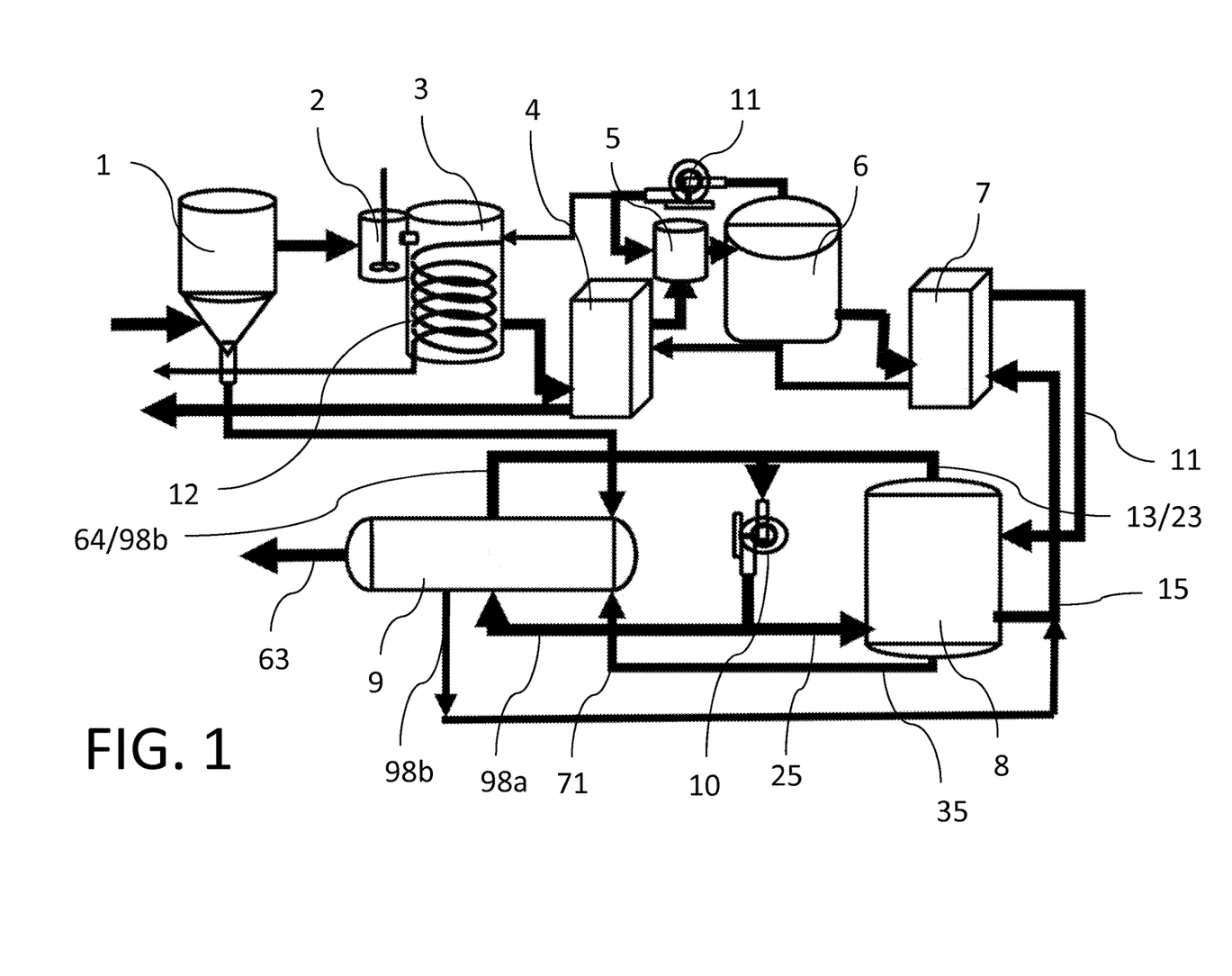
FIG. 1 is a schematic diagram of the method of recovering ammonium from treating wastewater effluent.

Referring to FIG. 1, the effluent stream preferably enters the system into a clarifier unit 1, where heavy particles settle out, large particles are removed by a filter, and light particles are removed by floatation. The clarifier unit 1 has a cone shaped lower part. Effluent enters the clarifier unit through the center of its cone shaped lower part. Inside the clarifier unit, above the effluent inlet, is a set of angled tubes to provide the contact area that facilitates settlement of the heavy particles. A filter unit is placed above the tube settlers to trap larger particles as the fluid moves upward. Fine lighter particles passing through the filter floats to the surface and is skimmed off from the top. As such, the effluent leaving the clarifier unit through the outlet, located at ⅔ height between the filter and the top fluid surface, contains mostly dissolved solids. Heavy solids and large particles retained by the filter in the clarifier unit 1 is removed by back-flushing—simply opening a valve at the bottom of the unit. Clarifier unit 1 may take various forms as are known in the art and will not be discussed further.

The filtered effluent then enters a mechanical homogenizer 2, where it is mixed at high-shear to further reduce particle size. The homogenized effluent is stored in a storage tank 3. Storage tank 3 preferably has a condenser coil 12 built into the interior that allows heated fluids from other components in the process to pre-heat the effluent in storage tank 3. From storage tank 3, the effluent is pumped through a heat exchanger 4 and a vapor injection unit 5, where the effluent is heated to 80° C. The heated effluent is sprayed into a flash evaporator unit 6, where it partially evaporates. The vapor phase is enriched with ammonia and the remaining liquid is generally free of dissolved air. The vapor is extracted and compressed by a compressor 11. Preferably, compressor 11 also maintains a negative pressure relative to atmospheric pressure within evaporator unit 5 in order to lower the vaporization point of ammonia in the fluid stream. A first stream of the extracted vapor is recycled through the vapor injection unit 5 to increase the concentration of ammonia in the vapor. A second stream of the extracted vapor is sent to condenser coil 12 to preheat the input effluent and to cool and condense the ammonia stream. The condensed ammonium solution is collected from the condenser.

The separate containers for the homogeniser 2 and the holding tank 3 allows for only a small volume of liquid being stirred at any given time, reducing energy requirements. The coil condenser in the holding tank 3 is used to condense ammonia enriched vapor from flash evaporator 6 after it is recompressed by vapor compressor 11. For the vapor that is compressed by compressor 11, the ratio between the portions that recycled back to the flash evaporator 6 and that which is condensed through the coil condenser contained in the holding tank 3, is controlled by a flow control valve. The ratio between the two vapor streams is adjustable and determines the concentration of the condensed ammonia solution leaving the coil condenser. The flash evaporator unit also serves the dual purpose of de-airing the effluent in that the remaining liquid would be free of dissolved air, important for the following steps.

In situations where the described method and separator equipment is used on other water-based effluent streams, it will be understood that the process of removing ammonia may also be used to remove other chemicals from the effluent stream, and is most effective at removing chemicals that have a boiling point that is less than the boiling point of water. Generally, the effluent is heated to a point that is less than the boiling point of water and above the boiling point of the chemical being removed. The actual temperature and pressure used will depend on the preferences of the user and the composition of the effluent being treated. Alternatively, if the effluent stream only contains water and solids, the steps up to and including flash evaporator 6 may be omitted.

Figure 2:
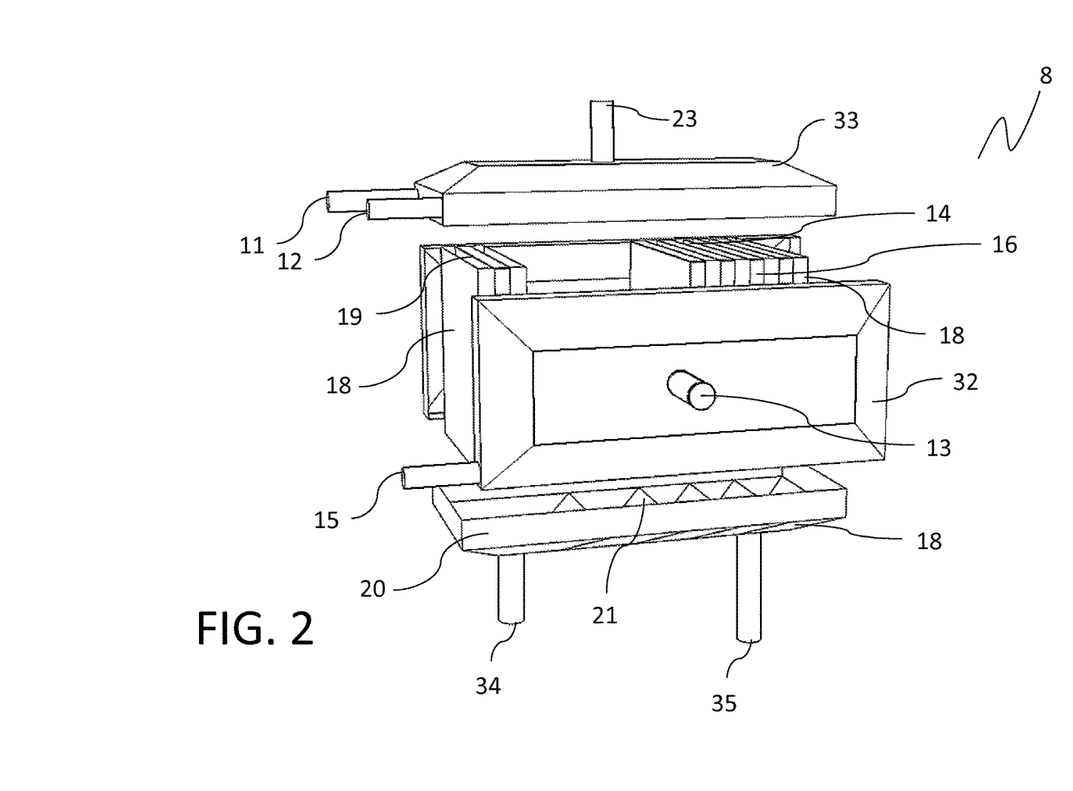
FIG. 2 is an expanded perspective view of a thin plate evaporator.

After flash evaporator 6, the majority of the effluent remaining in liquid form is further heated through a heat exchanger 7 and then sent to the multi-stage thin-plate evaporator 8. Thin plate evaporator 8 functions as a separator for separating fluid from a water-based effluent. Referring to FIG. 2, waste effluent enters the thin-plate evaporator 8 through inlet 11 and is distributed by spray tube 42 on top panel 33. In the preferred embodiment, the thin-plate evaporator 8 is designed to concentrate waste effluents down to a slurry of about 75% to 85% water.

Figure 5:
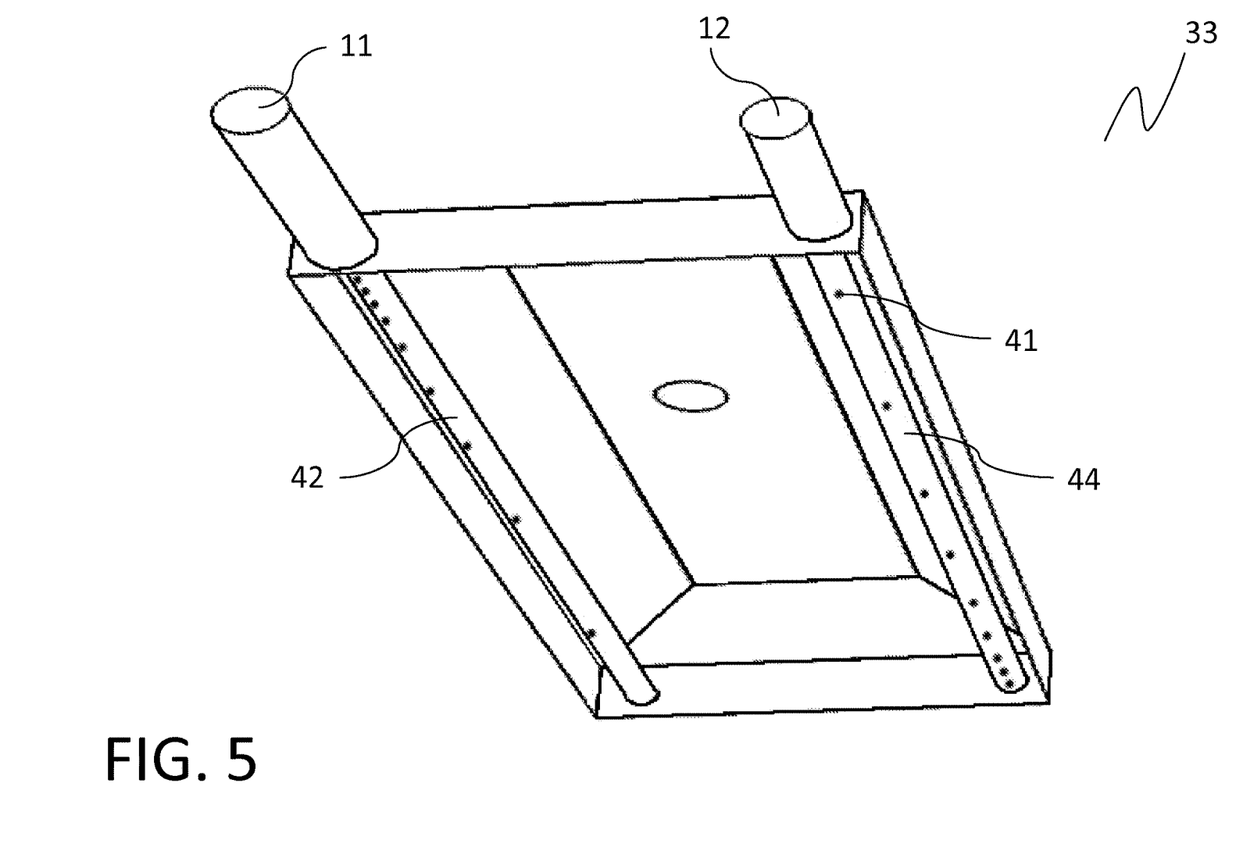
FIG. 5 is a perspective view of the interior side of a top panel of a thin plate evaporator.

As shown in FIG. 5, top panel 33 serves as a fluid manifold that injects water-based effluent into the plurality of effluent flow channels 14. The water-based effluent flows through inlet 11, and spray tube 42 is a first injector that is connected to receive and distribute this water-based effluent. Referring back to FIG. 1, multi-stage thin-plate evaporator 8 has a plurality of effluent flow channels 14 that are vertical or have a vertical component through which the effluent stream flows, and a plurality of heated fluid flow channels 16 through which heated fluids flow, such as heated air or steam. In the depicted embodiment, effluent flow channels 14 and heated fluid flow channels 16 are formed from parallel plates, which provides a useful way of increasing the amount of surface area between the channels. However, it will be understood that the primary purpose of channels 14 and 16 is to act as a heat exchanger and other heat exchanger designs may also be used, such as tubes, corrugated sheets, etc. where the heated fluid flows apart from the fluid to be heated.

Figure 3:
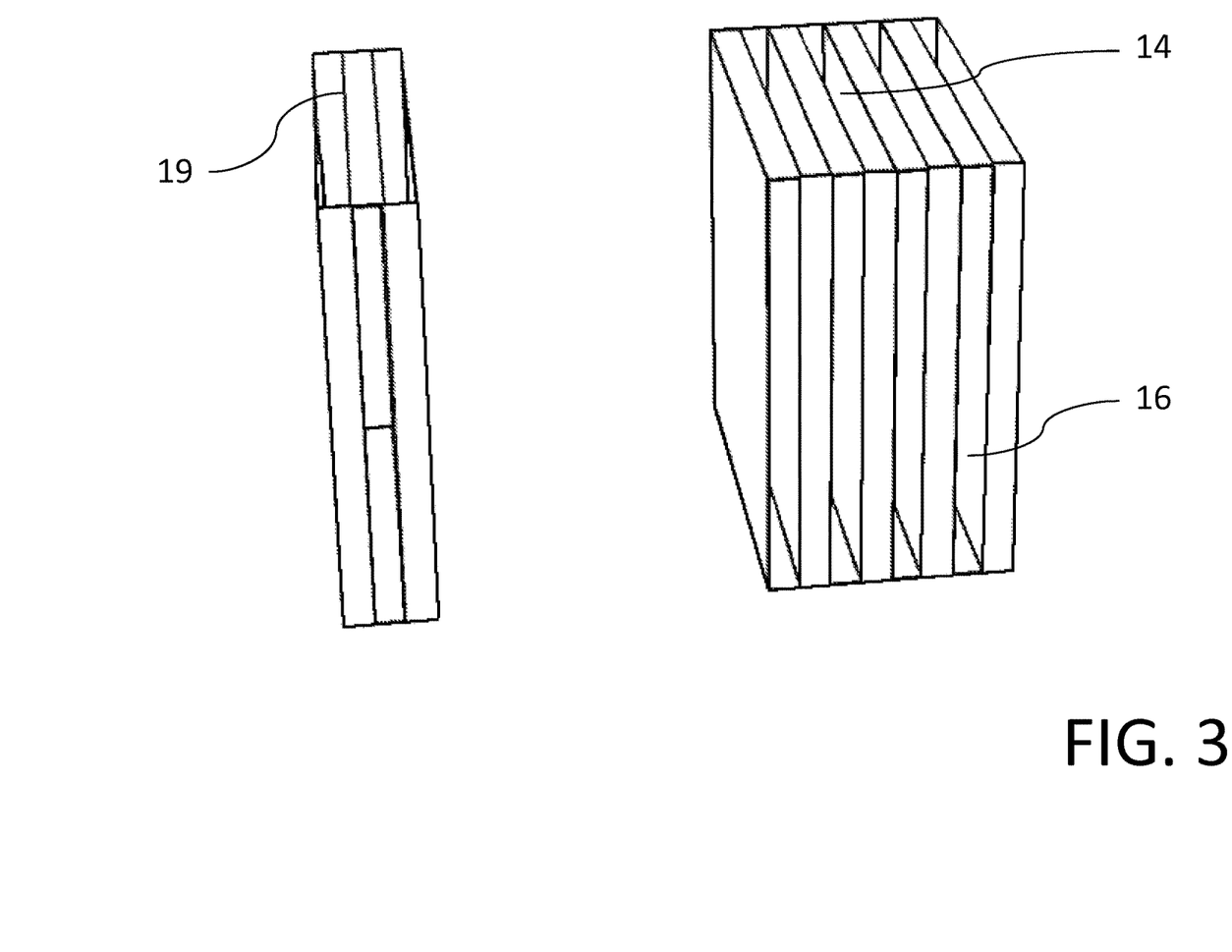
FIG. 3 is a perspective view of the heat exchanger plates of a thin plate evaporator.
Figure 4:
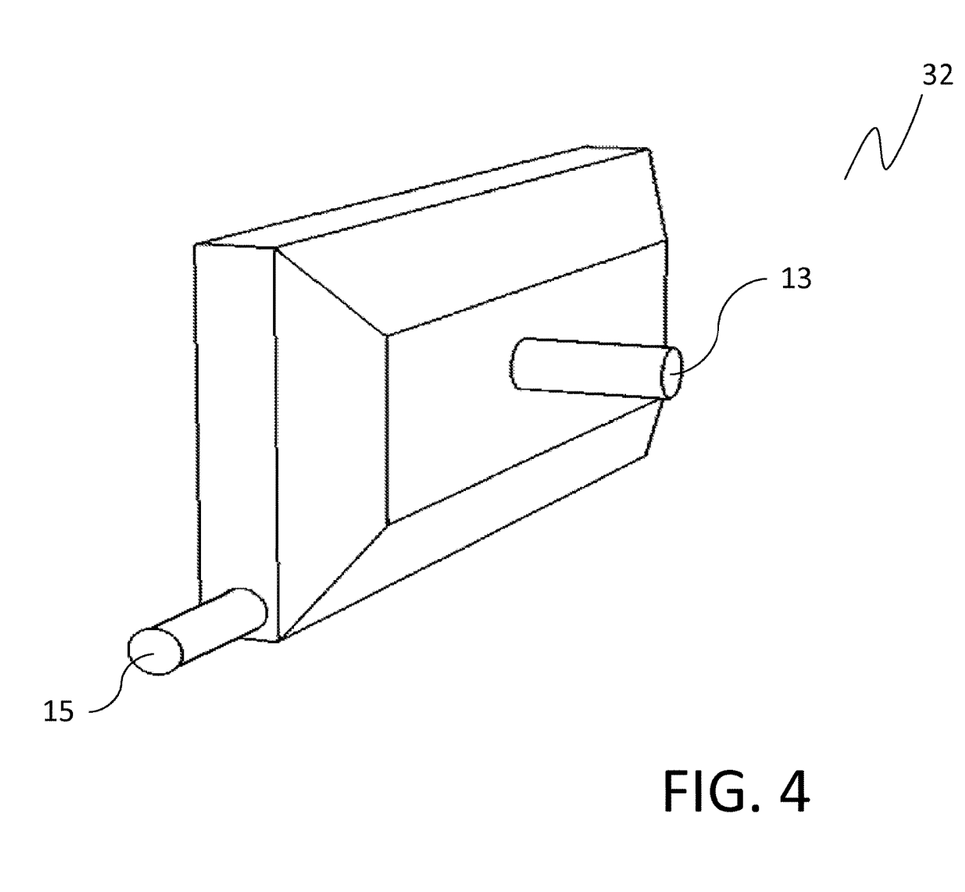
FIG. 4 is a perspective view of a side panel of a thin plate evaporator.

The heated fluid flow channels 16 have a heated fluid inlet 25 and heated fluid outlets 13 and 15. As shown, outlet 13 is for steam and outlet 15 is for condensed water. Outlets 13 and 15 could be combined into one outlet, depending on how the heated fluid is managed or processed after exiting flow channels 16. Spray tube 42 introduces the effluent such that it flows vertically downward in thin films over the surfaces of the heat exchanger plates 19 between effluent channels 14 and heater channels 16. Evaporation occurs over the heat exchanger plate 19 surfaces. The heated fluids in heater channels 16 are preferably sealed from the effluent channels 14 to prevent dilution or contamination. The heated fluid flow channels 16 are adjacent or in contact with the effluent flow channels 14 to allow heat to be transferred from the heated fluid, i.e. steam, to the effluent in flow channels 14 to vaporize a portion of the water-based effluent, which will generally be the water. Heater channels 16 may run perpendicular or anti-parallel to effluent channels 14. The detail of the channels 14 and 16 is shown in FIG. 3. This allows for large heat exchange surface area per unit volume resulting in a compact design with high capacity. In the preferred embodiment, surface areas of 50 $m^2$ per cubic meter of the evaporator volume can be built. Steam enters the evaporator 8 through inlet 25 and condenses on the opposite sides of the heater channels 16. The condensed clean water exits through an outlet 15. Outlets 13 and 15 are also shown on side panel 32 in FIG. 4. The evaporated vapor is extracted through a vapor outlet 23 for collecting a vaporized portion of the water-based effluent, and is sent to a compressor. Uncondensed steam exits through an outlet 15 on the back of the unit and is recompressed, returning to inlet 25 (shown in FIG. 1) and forming a closed cycle, or being passed on to evaporator 9. As the effluent in effluent channels 14 are heated, the liquid will evaporate and flow up to the top of evaporator 8 where it is removed, while the remaining effluent falls into the bottom of evaporator 8. The vapor is primarily water based as the other liquid contaminants should have mostly been removed in the flash evaporator 6. The effluent at the bottom of evaporator 8 is pumped to the top of effluent channels 14 via inlets 11 and 12 and again passes through evaporator 8, which further concentrates the effluent stream as more water is removed. As shown, evaporator 8 is made up of stages 18 of one or more effluent channels 14 and a sump 20 corresponding to each stage 18, where the effluent channels 14 in a particular stage 18 deposit effluent in a designated sump 20. Effluent is drawn from the sumps 20 of at least the first and last stages and distributed along the top of the corresponding effluent channels 14 from the corresponding sump 20. The first sump 20, connected to outlet 34, receives effluent with a higher water content than the last stage, which is connected to outlet 35. Preferably, more effluent flow channels deposit effluent into the first sump than the second sump. The series of sumps 20 are connected and separated by baffles 21 or other flow control device that permits fluid to overflow into an adjacent sump 20 and gradually pass to the next stage 18. Baffles 21 may also have openings 27 at the bottom to allow fluid to flow between sumps 20 by maintaining a liquid level in each baffle. In the depicted embodiment, effluent may also flow through openings 25 on the bottom of the baffles 21, shown in FIG. 6, allowing the effluent to flow to either of the outlets 34 or 35. The concentration gradient across the sumps is controlled by pumps (not shown) connected to outlets 34 and 35.

Figure 6:
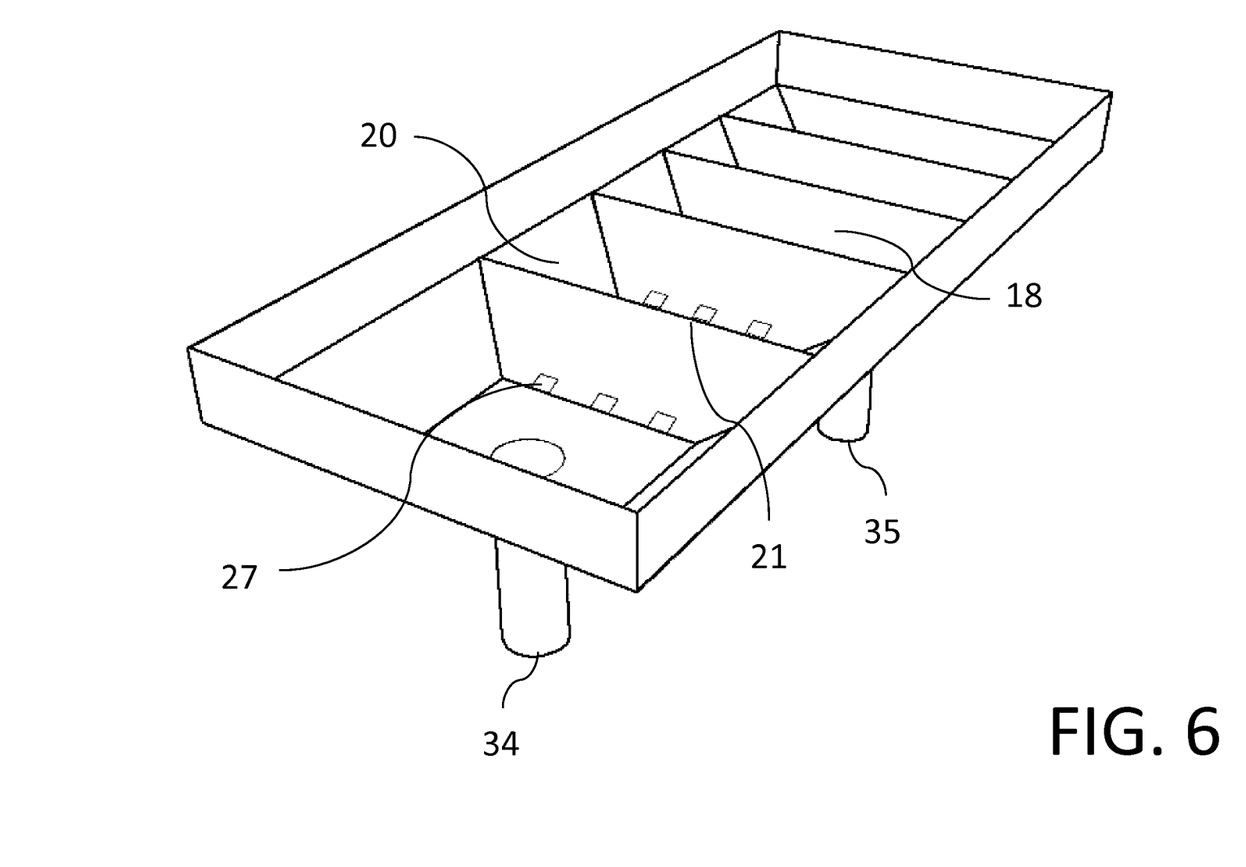
FIG. 6 is a perspective view of a divided sump of a thin plate evaporator.
Figure 7:
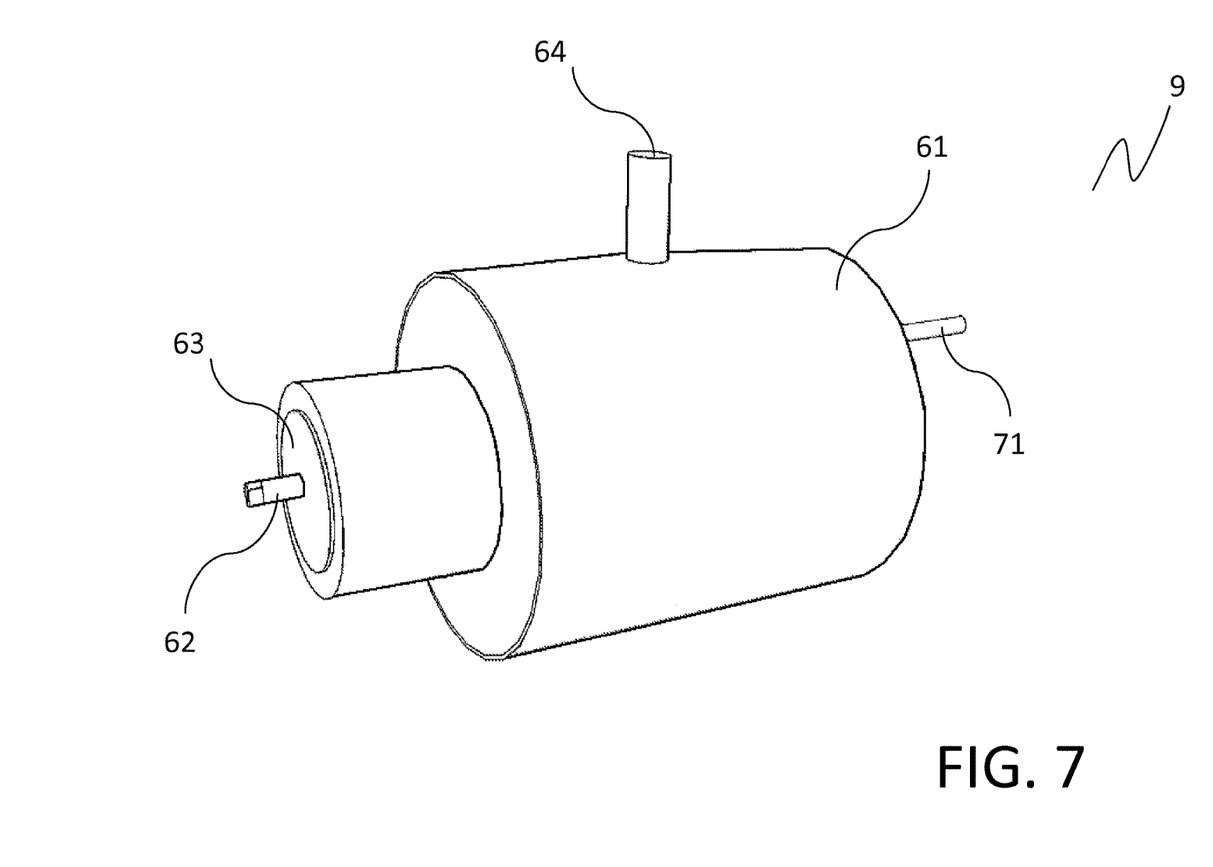
FIG. 7 is a perspective view of the exterior of a combined evaporator and extruder.
Figure 8:
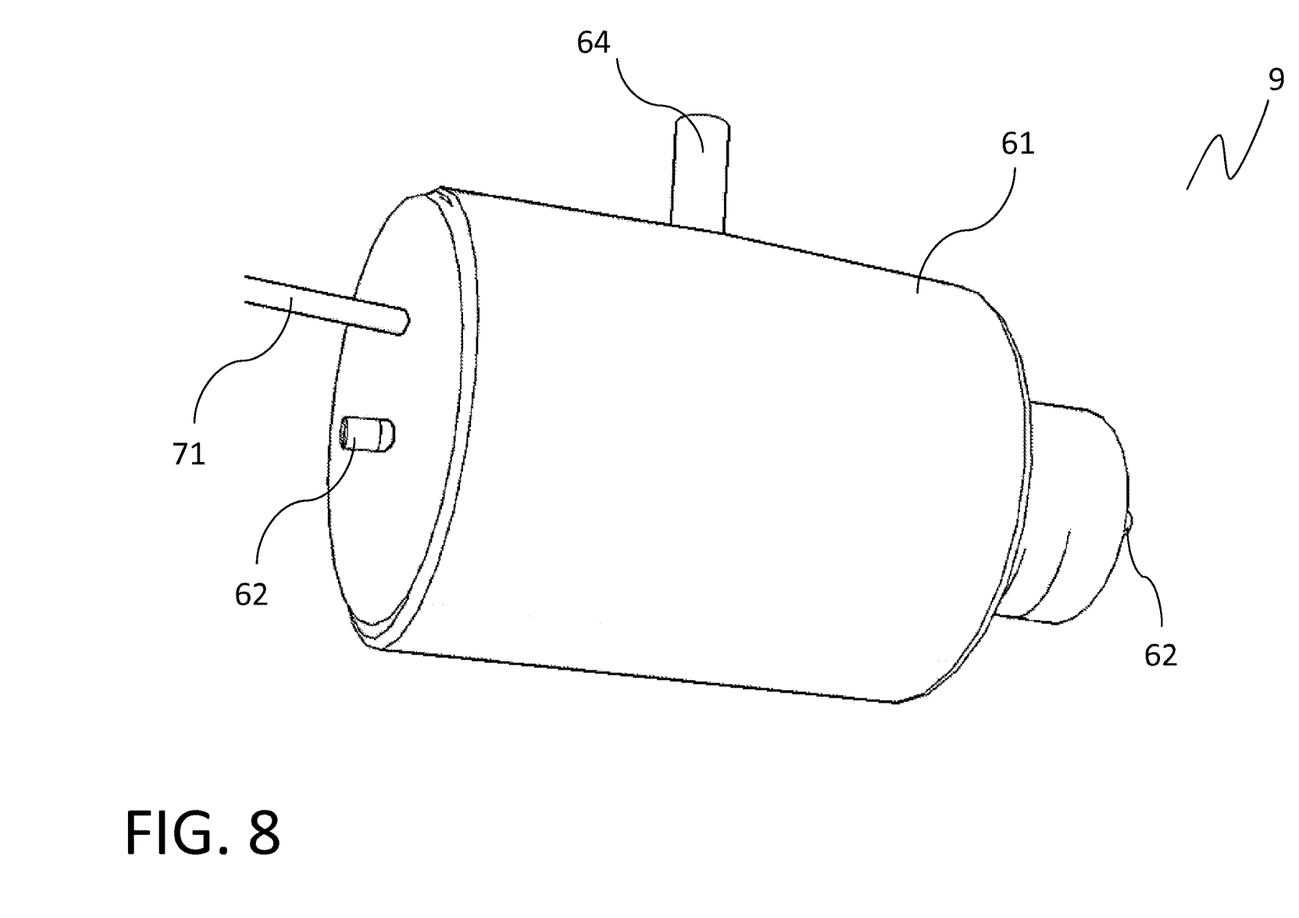
FIG. 8 is a perspective view of a second side of the exterior of a combined evaporator and extruder.

As more effluent is introduced into evaporator 8, the more concentrated effluent will be found in sumps 20 toward the last stage 18 relative to the first stage. Each sump 20 may have an outlet, although only the first and last sumps 20 are shown as having an outlet 34 and 35, respectively in the drawings. Effluent that has a higher water content, i.e. effluent from the heat exchanger 7 or drawn from the first stage, is mostly deposited into the first stage and therefore has a lower concentration when extracted by outlet 34. The fluid manifold of the top panel 33 is connected to receive water-based effluent both from heat exchanger 7 and from this first sump 20 at the first end of the series of sumps through outlet 34 and entering inlet 11. Effluent with a lower water content is extracted from outlet 35, and the fluid manifold 33 is also connected to receive this effluent from the last sump at the second end of the series of sumps from outlet 35 and through inlet 12. In the preferred embodiment, this fluid manifold 33 is a sealed unit connected to the effluent flow channels and further comprises a pump to remove the vaporized portion of the water based effluent. This pump may be a compressor which compresses the vaporized portion and injects the resulting stream of heated steam into the heated fluid inlet, and the heated fluid outlet comprises an outlet for condensed steam. It has been found that it is more efficient to evaporate water from effluent with a higher water content. By having multiple stages, it is possible to pass effluent with a higher water content through certain stages 18 separately from more concentrated effluent. In addition, the more concentrated effluent generally results in more servicing needs within evaporator 8. By having progressive stages, the service requirements are more isolated to certain stages 18.

Part of the concentrated effluent stream from outlet 35 is removed from the system as a final product and may be passed along to evaporator 9, as shown in FIG. 1. The remainder is sent to inlet 12 and recycled through spray tube 44, shown in FIG. 5. Spray tubes 42 and 44 are designed to provide a gradient of effluent concentrations across stages 18. As shown, this is done by providing varying nozzle 41 profiles. Spray tube 42 has a greater number of nozzles near the inlet 11, while spray tube 44 has a greater number of nozzles at the far end from inlet 12. This results in a concentration gradient of the effluent mixture across the length of the effluent channels 14, with the spacing of the openings being scaled to inject effluent in a desired gradient across the effluent flow channels, with more fluid from spray tube 42 entering the effluent flow channels associated with the first sump, and more fluid from spray tube 44 entering the flow channels associated with the second sump where the effluent is more concentrated, or has a lower water content.

As shown, the thin-plate evaporator 8 is divided into five stages. The first stage receives effluent input from heat exchanger 7. Stages 2 through 5 each receives fluid input from the previous stage, successively drying the input fluid to a total solid content of about 20%. This may be varied depending on the preferences of the user and the requirements of the system. Fluid recirculation for each stage is used to ensure the presence of a continuous film of liquid covering the evaporator surface. Extracted vapor is re-compressed by compressor 10 and recycled, condensing on the opposite side of the evaporator surface to provide the heat for evaporation. This unique multi-stage design ensures maximum efficiency and flexibility of the evaporation process while minimizing overall system complexity.

As mentioned above, any vapor, generally water, generated by the thin-plate evaporator 8 is extracted and re-compressed by a compressor 10. Preferably, compressor 10 maintains evaporator 8 at a lower pressure to enhance the vaporization of water in the effluent. The recovered vapor is sent back to evaporator 8 through heater channels 16 where the vapor releases the heat for evaporation into effluent channels 14, and condenses as a result. The condensed recovered water is sent through heat exchangers 7 and 4 where its heat content is further extracted to heat the incoming effluent.

After evaporator 8, the remaining effluent, which will generally have a thicker consistency, is fed into a combined disk evaporator/extruder 9 for further drying, shown in FIGS. 7-11. Evaporator 9 is primarily designed to dry wet slurries of 75-85% water to pelletized solids of less than 50% water. As a general overview, the concentrated effluent enters the evaporator 9 at one end and is propelled along its axis by a rotating action of the disk assemblies as the effluent loses moisture. At the opposite end of the evaporator 9 is attached a screw type extruder where dried solids are extruded to form pellets. Vapor, generally water vapor, from the disk evaporator 9 is extracted and re-compressed by compressor 10 and send back to evaporator 9 as heat source for evaporation, which condenses to recovered water. The recovered water is then sent through heat exchangers 7 and 4 to recover its heat contents to heat the incoming effluent.

Figure 9:
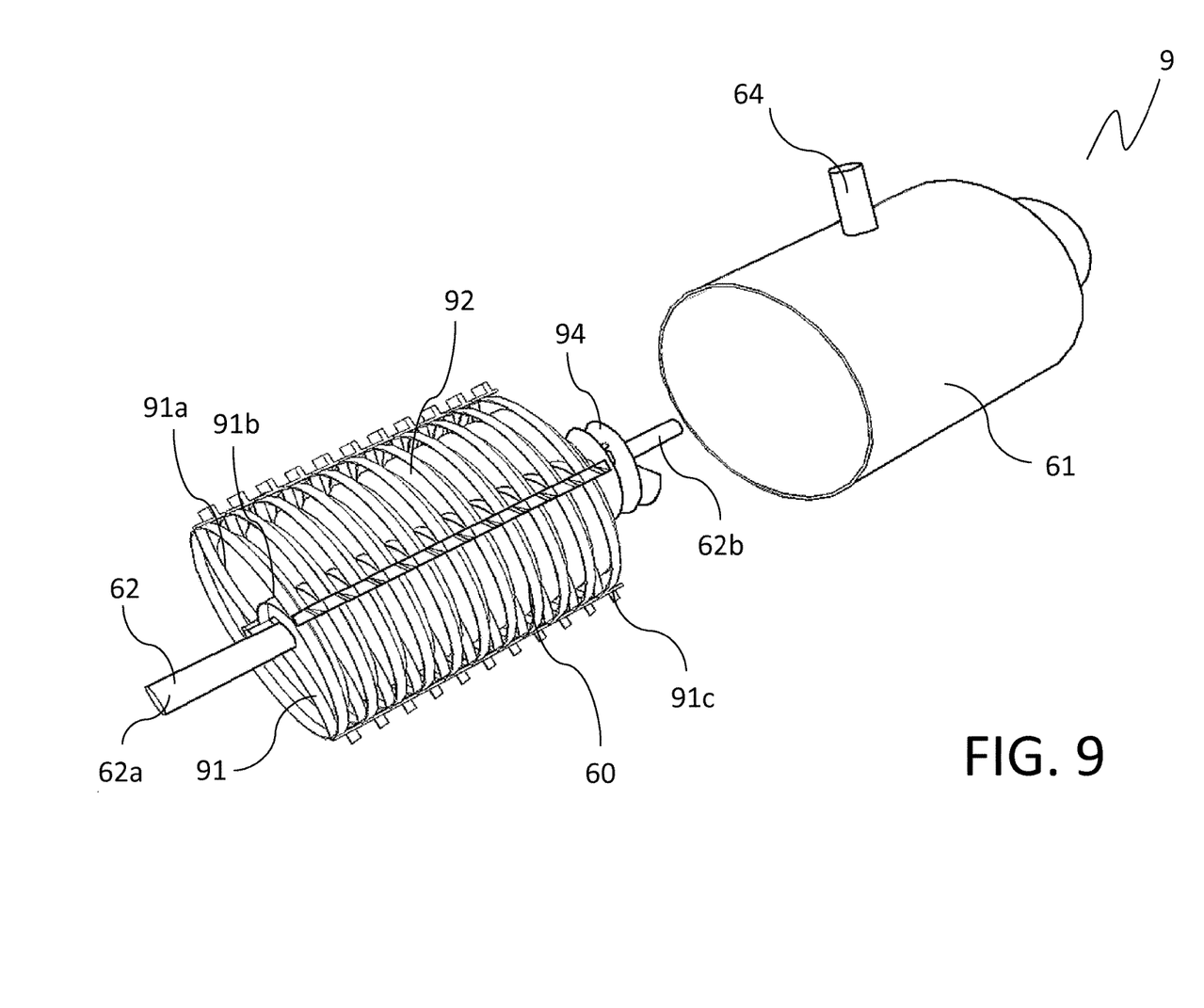
FIG. 9 is a perspective view of a combined evaporator and extruder with the interior evaporator disks and extruder shown.

The disk evaporator 9 provides further drying of the concentrated effluent that is not suitable for the thin-plate evaporator. In the preferred embodiment, the disk evaporator is intended to dry wet slurries of 75-85% water to pelletized solids of less than 50% water. Also, the heavy solids and large particles separated by settlement and filtration in the clarifier unit 1 is sent directly to the disk dryer 9. Disk evaporator 9 comprises a stationary outer shell or housing 61 with an independently rotating two-section shaft 62 running through the center. One portion of the shaft 62a has a flow path 98 having a steam input 98a and a condensed water outlet 98b, preferably by providing a hollow pipe with strategically located openings 96 connected to heat exchanger disks 92 as will be discussed below. Fluid from condensed water outlet 98b may be condensed water or steam, depending on the amount of heat extracted from the fluid. The condensed water is circulated through heat exchangers as described elsewhere and the steam is compressed and passed through evaporator 8 or 9. Preferably, hollow pipe 62a has a split path to provide both a supply path and a return path. The second part of the shaft 62b is an independently rotating solid shaft with a screw auger 94 affixed to it. Outer shell 61 houses heat exchanger disk assemblies 60 that are spaced along the cylindrical bore between the inlet 71 and the outlet 63 of shell 61. The heat exchanger disk assemblies 60 have an effluent driving surface that distributes a portion of the water-based effluent on the heated outer surface and moves another portion of the water-based effluent toward the outlet 63. In the depicted embodiment, these assemblies are made up of hollow heat exchanger disks 92 and spreader-scraper blade units 91 spaced along section 62a of the shaft 62.

Figure 10:
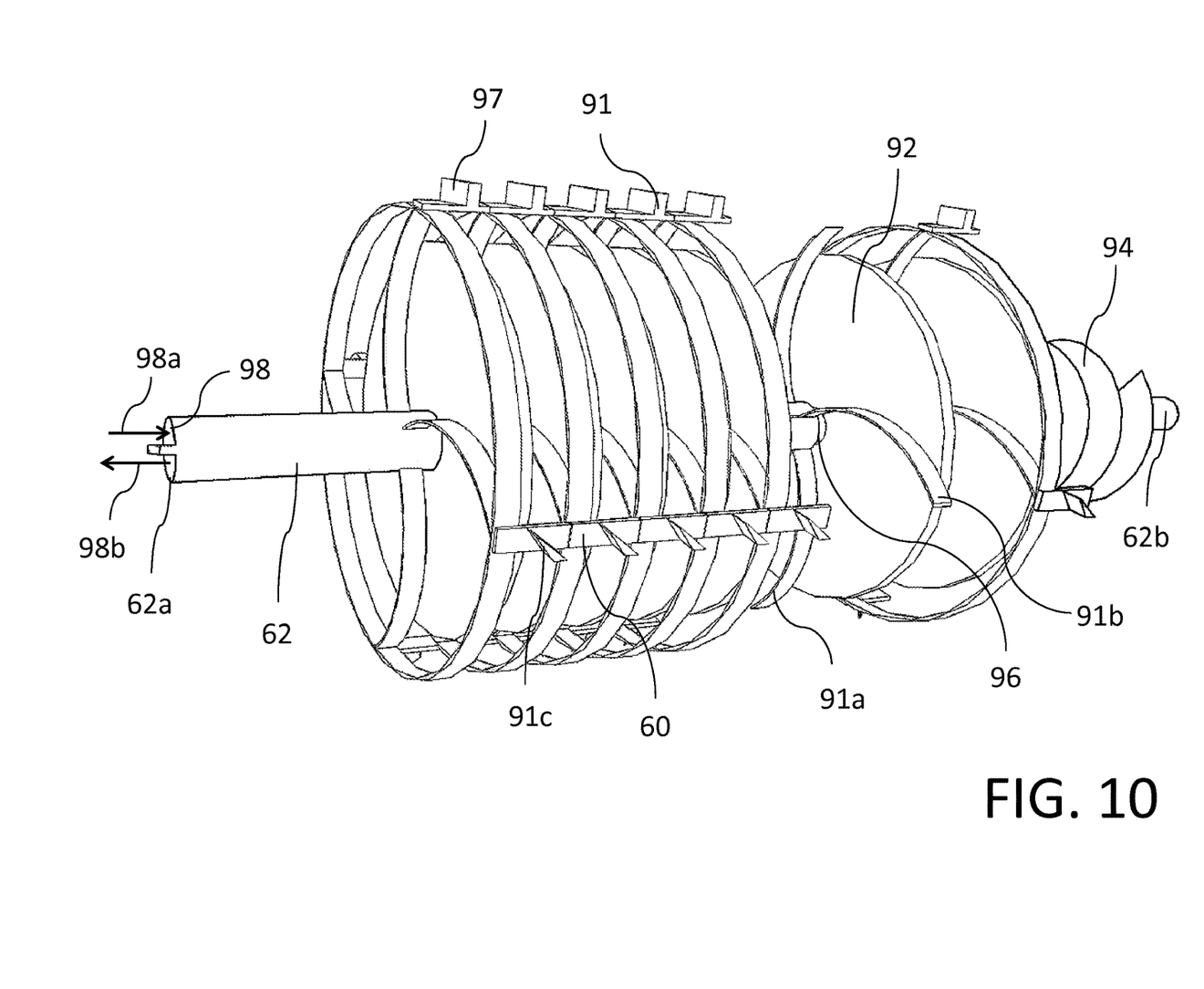
FIG. 10 is a perspective view of the interior evaporator disks and extruder showing the flow path of the heated water vapour.
Figure 11:
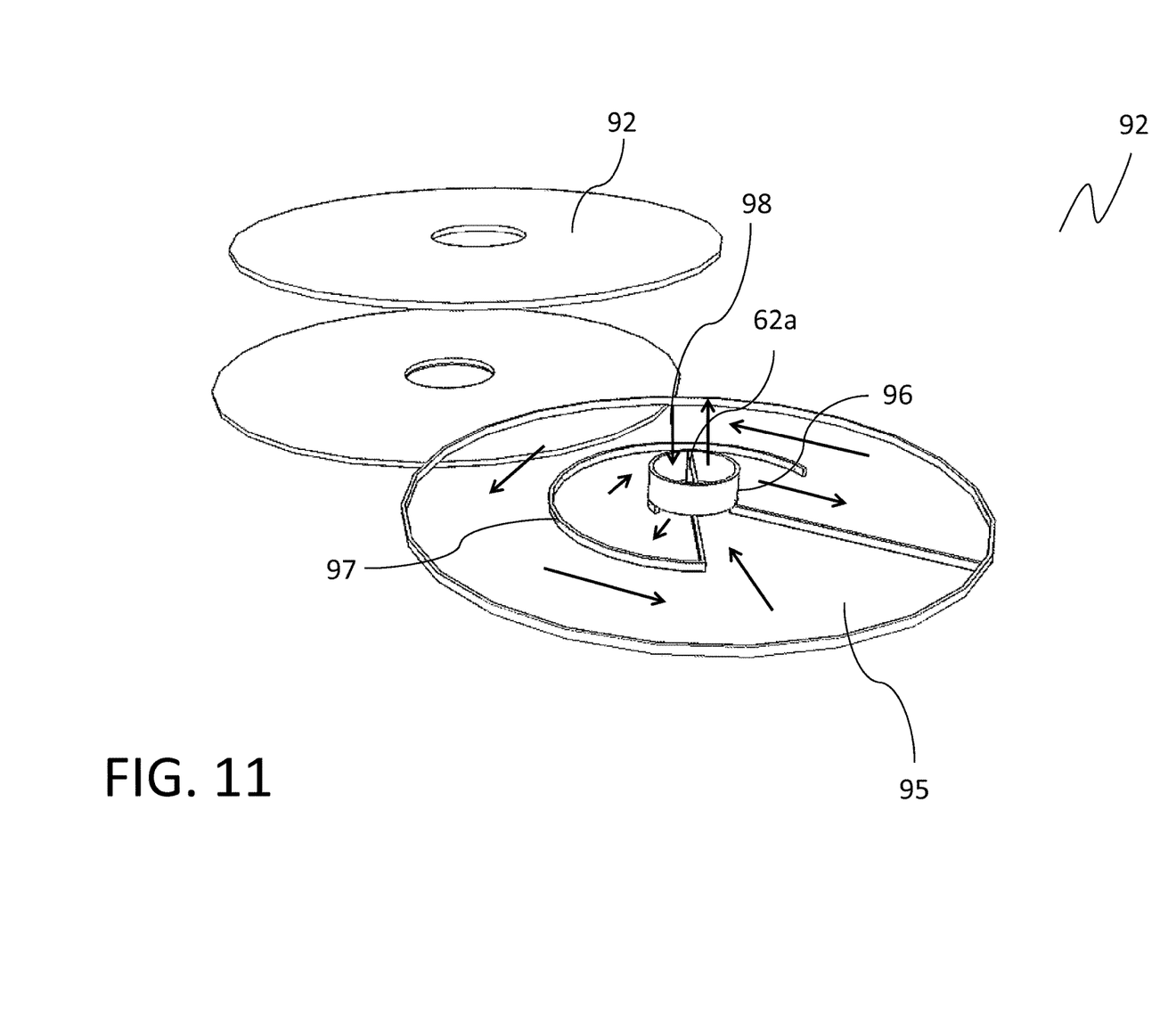
FIG. 11 is an expanded perspective view of an evaporator disk showing the inside and indicating the directions of flow of the heated water vapour.

Referring to FIG. 10, heat exchanger disks 92 have an inner chamber 95 and are fixed on the shaft 62a to cover the openings 96 such that the inner chambers are in fluid communication with the flow path 98 so that steam (or other heated fluids) enters the disk. As depicted, steam enters from one side of the split pipe shaft 62a and exits from the other side. The path between the inlet and outlet ports on pipe shaft 62a is defined by an internal baffle 97 that helps distribute the steam and therefore the heat across exchanger disk 92. Referring to FIG. 9, in the depicted example, each heat exchanger disk 92 is heated in parallel with other disks 92, where steam is provided along the supply path in shaft 62a to each of the disks 92 by the corresponding openings 96 and removed from the disks along the return path in shaft 62a. Heat is provided in the form of compressed vapor to the rotating disks inside the cylindrical container 61.

The spreader-scraper unit 91 is shown with several spreader-blades 91a that, when in rotation, spreads the slurry over the outer surface of the heat exchanger disk 92 and a scraper blade 91b that prevents residue build up on the surface of heat exchanger disks 92. As depicted, each set of spreader-scraper blades are enclosed in a ring 95, which are connected by a set of bars 96. Small, fin-like structure on the connecting bars 97 pushes the material forward as they rotate. The spreader-scraper blade assembly is affixed to the auger 94 and rotates with the auger while the heat exchanger disks 92 rotate independently. It will be understood that various combinations in the number or configuration of blades 91a and 91b may be used beyond the four curved blades that are shown. As will be understood, at least spreader-scraper unit 91 is rotated relative to the housing 61, in order to apply a force to the water-based slurry. As depicted, the rotation of the disks 92 is driven by the split-tube portion 62a of the shaft 62 and the rotation of the auger 94 and the spreader-scraper blade units 91 are driven by together by the second, solid portion 62b of the shaft 62. There is a sufficient gap provided between the perimeter of the heat exchanger disks 92 and the outer body 61 to permit slurry to be pushed toward the next exchanger disk assembly 60. As can be seen, the driver portions 91c are spaced such that they only apply a forward force to a portion of the slurry at a time. This increases the dwell time of the slurry in evaporator 9, and increases the contact with the heated outer surface of the disks 92. As depicted, spreader blades 91a are shaped to lift and spread a portion of slurry on disks 92 as disks 92 rotate in an opposite direction, and carry a driver portion 91c that is angled to push slurry forward. Alternatively, the effluent driving surface that spreads slurry and pushes it forward may be integrally formed into the disks 92. For example, disks 92 may be sectional portions of an auger that extends partially around shaft 62. These auger portions are shaped such that a portion of the slurry is lifted and spread. As the auger portions do not extend all the way around the shaft 62, the slurry is only intermittently pushed forward, increasings its dwell time in the evaporator 9.

The wet slurry enters the evaporator through inlet 71. As the spreader-scraper blades rotate, the material is spread over the surfaces of the heat exchanger disks where evaporation occurs. At the same time, the material is propelled forward by the rotating blades over the perimeter of the disks. The material gets progressively drier as it moves forward in the evaporator. The dried material reaching the end of the evaporation stack is pushed by the auger 94 and finally extrudes through a perforated plate 63.

At the end of the evaporator is fitted a screw-type extruder. The rotating screw forces dried organic waste through the extruder openings in perforated plate 63 and drops into a pressure controlled receiving unit in the form of a pelletized product.

The perforated plate 63, where dried product is discharged, is preferably enclosed by a sealed discharge vessel (not shown) kept at same pressure as inside the evaporator to prevent air from entering the evaporator 9, as the evaporator 9 is preferably kept at a reduced pressure. This also allows the generated vapor to be more efficiently captured from the evaporator 9. The vapor is extracted from outlet 64, compressed, and sent to the input side of split pipe 62. The un-condensed steam and condensed, clean water exits from the output side of pipe 62. After separation from water, steam is re-compressed and recycled back to the input.

In a preferred embodiment, the system preferably recycles the heat and steam generated in order to reduce the amount of energy required. It will be understood that the specific arrangement of heat exchangers and compressors may be rearranged in other ways that will also apply the necessary heat to separate the slurry components. In this preferred embodiment, the system starts with externally generated steam being supplied to the vapor injector unit 5, and to the thin-plate 8 and disk 9 evaporators through compressor 10. The external steam is turned off once the system achieves heat balance and becomes self sustaining. The system takes organic effluents and turns it into ammonia solution, clean water, and dry organic solids. By its configuration of heat exchangers and vapor-compressors, a nearly complete heat recovery is achieved, which allows for a theoretical efficiency of just 35 kWh/T. In the case of biowaste slurries, one main benefit of the technology is to enable the biogas technology to reach its full environmental and economic potential by providing an effective solution for digestate treatment. Mitigation of GHG emissions, reduced risk of land and water contamination from excess nutrients, and contribution toward a more sustainable regional nutrient flow and distribution, are some of the highlights of its environmental benefits. Economic benefits include value-added, marketable products including renewable energy, biofertilizer and clean water, savings in biowaste handling and application costs, and GHG emission offsets. In the meantime, it will also address social objections for land application of these biowastes. Overall, the system when used with biowaste slurries receives organic effluents, extracts its ammonia in concentrated ammonium solutions, and produces clean water and pelletized organic solids. The extracted ammonia can be recombined with the solids to form an organic biofertilizer rich in ammonia.

The method has been described using organic effluents as an example with the ultimate goal of recovery of ammonium and the production of organic fertilizer. It will be understood that the method is not limited to organic effluents. As described above, organic effluents can be processed to produce organic fertilizer. Other wastewater effluents, such as oil sand tailings, may produce only clean water and small quantities of solid waste. This may be passed directly to evaporators 8 and 9, or if other liquid components are present, may also be treated by flash evaporator 6 to remove these components from the water prior to drying the slurry.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A separator for separating fluid from a water-based effluent, comprising:
    a plurality of effluent flow channels;
    a plurality of heated fluid flow channels having a heated fluid inlet and a heated fluid outlet, the plurality of heated fluid flow channels being adjacent to the plurality of effluent flow channels for transferring heat from a heated fluid to the plurality of effluent flow channels to vaporize a portion of the water-based effluent;
    a vapour outlet for collecting a vaporized portion of the water-based effluent;
    a series of sumps connected to receive effluent from the plurality of effluent flow channels, the series of sumps being connected by baffles that permits fluid to flow into an adjacent sump,
    wherein each of the plurality of effluent flow channels deposits effluent into a designated sump, the designated sump receiving effluent from an effluent flow channel as the effluent flows downward due to gravity;
    a fluid manifold that injects water-based effluent into the plurality of effluent flow channels, and the fluid manifold comprising:
        a first injector that is connected to receive water-based effluent from a source of water-based effluent and from a first sump at a first end of the series of sumps;
        a second injector that is connected to receive water-based effluent from a second sump at a second end of the series of sumps opposite the first end;
    wherein both the first and second injectors distribute effluent into a plurality of effluent flow channels of at least the first sump and the second sump such that each of the plurality of effluent flow channels that deposits effluent into the first sump receives water-based effluent from the fluid manifold that has a higher water content than each of the plurality of effluent flow channels that deposits effluent into the second sump.

2. The separator of claim 1, wherein the plurality of effluent flow channels and the plurality of heated fluid flow channels are defined by a series of parallel plates.

3. The separator of claim 2, wherein the direction of flow through the plurality of effluent flow channels is perpendicular or antiparallel to the direction of flow through the plurality of heated fluid flow channels.

4. The separator of claim 1, wherein more of the plurality of flow channels deposit effluent into the first sump than in the second sump.

5. The separator of claim 1, wherein the first and second injectors comprise nozzles for spraying effluent into the plurality of effluent flow channels.

6. The separator of claim 1, wherein the first and second injectors are defined by openings, and a spacing of the openings are scaled to inject effluent in a gradient across the plurality of effluent flow channels associated with the series of sumps, such that the first injector injects more fluid into each of the plurality of effluent flow channels associated with the first sump and the second injector injects more fluid into each of the plurality of effluent flow channels associated with the second sump.

7. The separator of claim 1, wherein the fluid manifold is sealably connected to the plurality of effluent flow channels and further comprises a pump to remove the vaporized portion of the water-based effluent.

8. The separator of claim 7, wherein the pump is a compressor that compresses the vaporized portion and injects a resulting stream of heated steam into the heated fluid inlet.

9. The separator of claim 8, wherein the heated fluid outlet comprises an outlet for condensed steam.

10. The separator of claim 1, wherein the series of sumps comprises at least one intermediate sump between the first and second sump that feeds the second sump exclusively.

* * * * *